(12) United States Patent
Rachamadugu

(10) Patent No.: US 10,776,172 B1
(45) Date of Patent: Sep. 15, 2020

(54) COST OPTIMIZED SERVICES FOR DYNAMIC SERVICE LEVELS

(71) Applicant: Oath Inc., New York, NY (US)

(72) Inventor: Sreenivas Rachamadugu, Broadlands, VA (US)

(73) Assignee: Oath Inc., New York, NY (US)

( * ) Notice: Subject to any disclaimer, the term of this patent is extended or adjusted under 35 U.S.C. 154(b) by 0 days.

(21) Appl. No.: 16/731,109

(22) Filed: Dec. 31, 2019

(51) Int. Cl.
*G06F 15/173* (2006.01)
*G06F 9/50* (2006.01)
*H04L 12/911* (2013.01)
*H04L 29/08* (2006.01)

(52) U.S. Cl.
CPC .......... *G06F 9/5072* (2013.01); *G06F 9/5027* (2013.01); *G06F 9/5077* (2013.01); *G06F 9/5088* (2013.01); *H04L 47/70* (2013.01); *H04L 67/10* (2013.01)

(58) Field of Classification Search
CPC .... G06F 9/5072; G06F 9/5027; G06F 9/5077; G06F 9/5088; H04L 47/70; H04L 4/12
See application file for complete search history.

(56) References Cited

U.S. PATENT DOCUMENTS

| | | | |
|---|---|---|---|
| 2016/0026202 A1* | 1/2016 | Venkataraman | G05F 1/66 700/298 |
| 2018/0064360 A1* | 3/2018 | Siejko | A61B 5/7214 |
| 2018/0154484 A1* | 6/2018 | Hall | B23K 26/0604 |
| 2019/0138638 A1* | 5/2019 | Pal | G06F 16/2465 |
| 2019/0138639 A1* | 5/2019 | Pal | G06F 16/211 |
| 2019/0138640 A1* | 5/2019 | Pal | G06F 16/2471 |
| 2019/0138641 A1* | 5/2019 | Pal | G06F 40/205 |
| 2019/0138642 A1* | 5/2019 | Pal | G06F 16/2471 |
| 2019/0147084 A1* | 5/2019 | Pal | G06F 16/24554 707/769 |

* cited by examiner

*Primary Examiner* — Thanh T Nguyen
(74) *Attorney, Agent, or Firm* — Cooper Legal Group, LLC

(57) ABSTRACT

One or more computing devices, systems, and/or methods for cost optimized services for dynamic service levels are provided. Components of a service are hosted across a first set of infrastructure tiers that satisfy a service level of the service at a first point in time. Costs associated with levels of computing resources provided infrastructure tiers are monitored. The service is monitored to dynamically detect a current service level of the service at a second point in time. One or more of the components are migrated to a second set of infrastructure tiers based upon the current service level of the service and costs associated with the second set of infrastructure tiers.

20 Claims, 8 Drawing Sheets

COST OPTIMIZED SERVICES FOR DYNAMIC SERVICE LEVELS

BACKGROUND

A service, such as a multi-tier application, may have various components that can be hosted, such as through compute instances (e.g., virtual machines), at particular infrastructure tiers of a multi-tier infrastructure. In an example, a first virtual machine executing at a server of a server tier may host a database of the service, a second virtual machine executing at an on-premises device of an on-premises tier may host an application server of the service, a third virtual machine executing within a cloud computing tier may host a backup data store of the service, etc.

The components of the service have static residence within the multi-tier infrastructure. That is, a component always executes at the same location (e.g., infrastructure tier) at which the component was installed. This is because the location of the compute instances hosting the components are generally defined as design time. A provider of the service may specify the location based upon the most stringent service levels (e.g., service level agreements) that may be required by the service at a particular point in time. Unfortunately, the inability to relocate components amongst different infrastructure tiers (e.g., amongst different types of infrastructure tiers or amongst different providers of a same type of infrastructure tier) can result in substantial loss of cost savings because the components may be located at relatively more expensive infrastructure tiers even during time periods where less expensive infrastructure tiers could satisfy a current service level for the service. At best, horizontal scaling can be performed where additional instances of a component could be created at the same infrastructure tier (e.g., multiple virtual machines may be created at the on-premises tier for hosting multiple instances of the application server), which still does not achieve cost effective deployment and hosting of the service because other different infrastructure tiers could satisfy the current service level at a reduced cost.

SUMMARY

In accordance with the present disclosure, one or more computing devices and/or methods for cost optimized services for dynamic service levels are provided. For example, components of a service may be hosted across a first set of infrastructure tiers of a plurality of infrastructure tiers based upon the first set of infrastructure tiers providing a level of computing resources (e.g., CPU cycles, storage space, bandwidth, latency, I/O per second (IOPS), redundancy, security, etc.) satisfying a service level (e.g., a service level agreement specifying an amount of storage, CPU cycles, acceptable latency, bandwidth, security, compression, redundancy, availability etc.) of the service at a first point in time. The plurality of infrastructure tiers may correspond to a client device tier (e.g., data may be cached on a client device or an application may be hosted on the client device), a network edge tier (e.g., a computing device that is an entry point into a provider's core network, such as a device to which client devices initially connect), a network core tier (e.g., devices that are part of a core/backbone of the provider's core network), a cloud tier, an on-premises tier, a server tier, etc. In an example, multiple infrastructure tiers may be of the same type (e.g., a cloud tier) but are provided by different providers (e.g., multiple cloud service providers) that may have different costs and/or provide different levels of computing resources. In another example, the same component could be run at different tiers but may be selected to run at one tier at design time to meet the most stringent SLA for the component. However, this most stringent SLA may not be required all the time.

Costs associated with levels of computing resources provided by the plurality of infrastructure tiers may be monitored. For example, the cost of storage, the cost of compute (e.g., the cost of compute provided by various providers and at various tiers may fluctuate over time, along with the service levels provided by the providers and locations may also fluctuate, and thus changes in pricing and SLA can be tracked), etc. provided by various providers may fluctuate over time, and thus such cost trends may be tracked. Thus, the costs of compute and storage can change over time by provider, and thus these costs are monitored at a component level and are tracked over time. The service may be monitored to dynamically detect a current service level of the service over time, such as at a second point in time. The current service level may correspond to an observed increase/decrease in demand of the service (e.g., during a busy holiday shopping week, demand of a credit card processing service may significantly increase for that week), a requested change to a service level agreement (e.g., the service may provide an indication that additional or reduced computing resources are requested), a specification of the current service level (e.g., a provider of the service may specify a new service level agreement for the service), etc.

A second set of infrastructure tiers may be identified as providing a second level of computing resources satisfying the current service level. The second set of infrastructure tiers may be selected to include infrastructure tiers that minimize a cost of hosting the service while still satisfying the current service level of the service. In an example, if a cost to migrate one or more of the components to the second set of infrastructure tiers is less than a cost savings corresponding to a difference between a cost of hosting the components at the first set of infrastructure tiers and a cost of hosting the components at the second set of infrastructure tiers, then one or more components of the service are migrated from the first set of infrastructure tiers to the second set of infrastructure tiers. In an example, if the first set of infrastructure tiers do not satisfy the current service level, then the components of the service may be migrated to the second set of infrastructures tiers regardless of the cost to migrate since the first set of infrastructure tiers do not satisfy the current service level.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
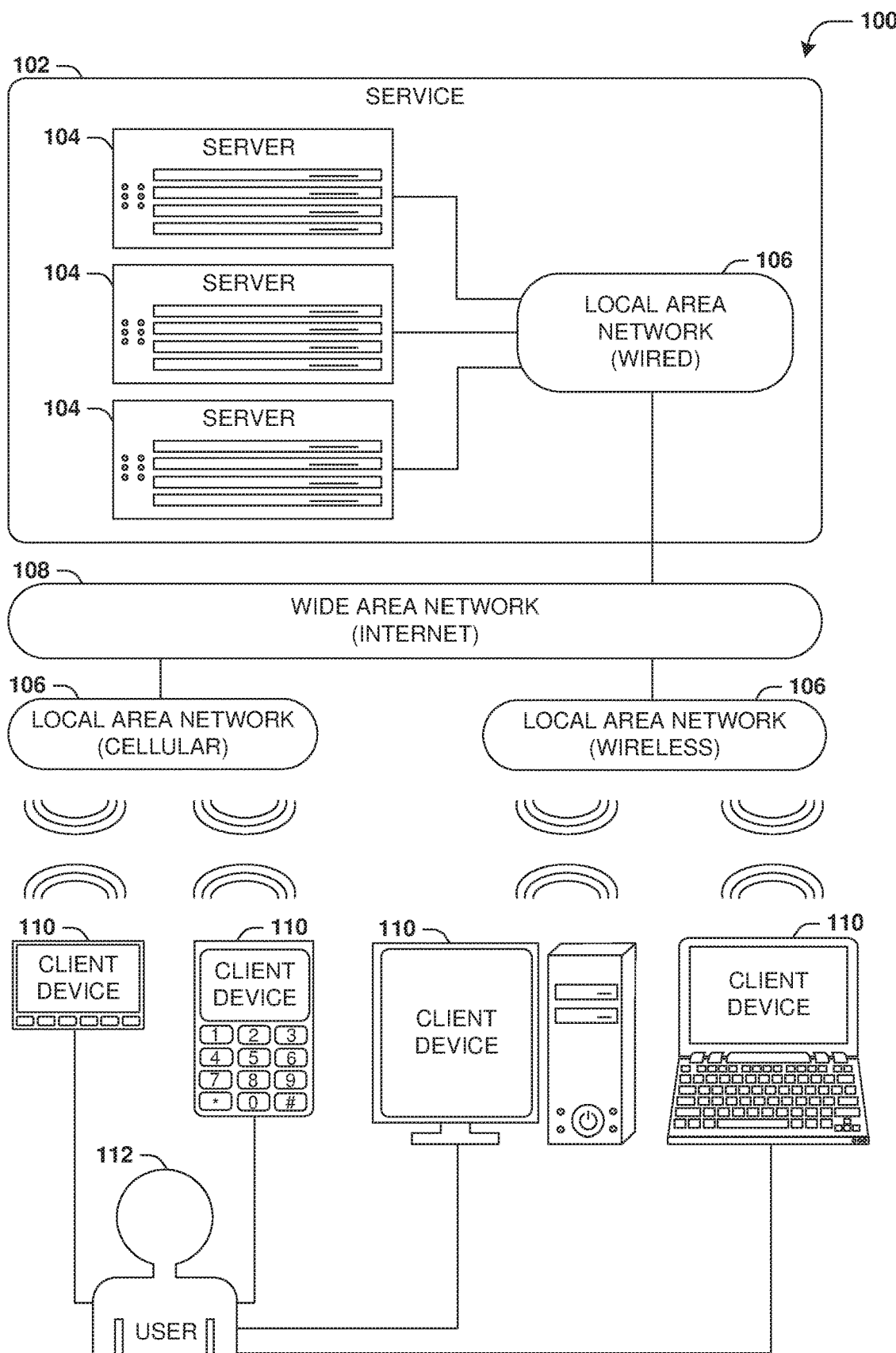
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
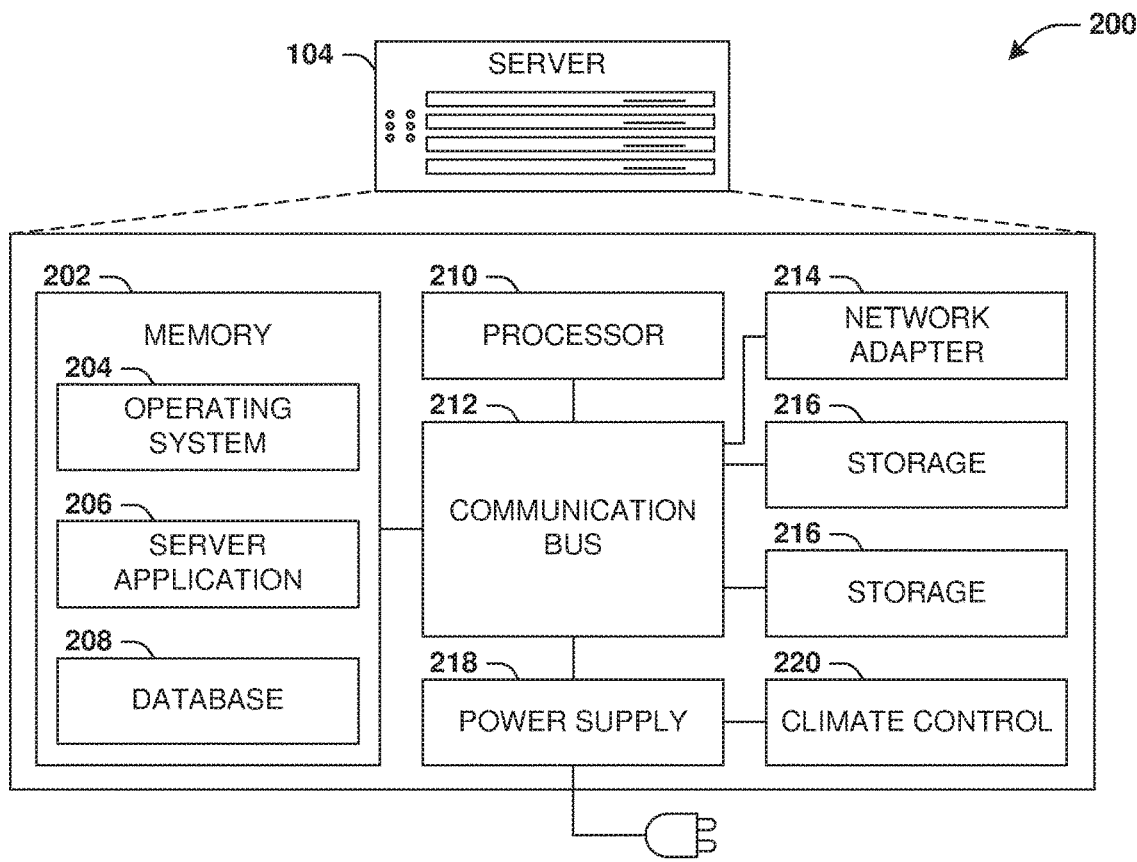
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
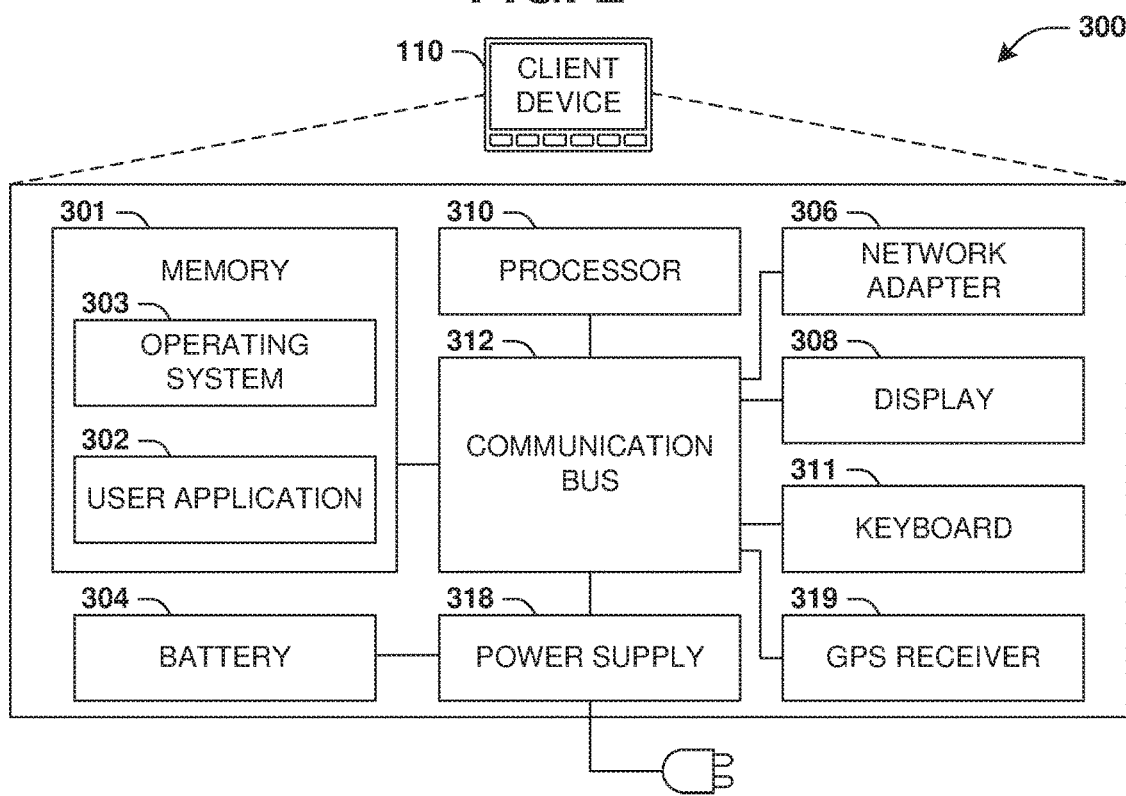
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

Techniques are provided for cost optimized services for dynamic service levels. A service may comprise one or more components (e.g., a database component, an application server component, a backup data store component, etc.) that can be hosted at various infrastructure tiers of a multi-tier infrastructure environment. The multi-tier infrastructure environment may comprise a client device tier (e.g., client devices), a server tier, a cloud tier (e.g., cloud service providers), an on-premises tier (e.g., computing devices and a network maintained on-premises by a provider of the service), a network edge tier (e.g., devices connecting an enterprise-owned network to a third party network), a network core (e.g., a central computing element of a network that may provide relatively higher levels of computing resources than a network edge device), etc. Each infrastructure tier and various providers of each infrastructure tier (e.g., multiple cloud service providers may each offer their own cloud infrastructure tier) may provide varying levels of computing resources of various costs. Unfortunately, components are generally assigned at design time to particular infrastructure tiers. This assignment does not change over time even though a service level of the service may change over time (e.g., a coffee shop retail chain may experience higher than normal demand on certain days for processing orders through a business transaction service, and lower than normal demand on other days). Thus, a provider of the service is unable to obtain potential cost savings by using lower cost infrastructure tiers when a decreased service level is currently needed because the assignment of components to infrastructure tiers was set at design time.

Accordingly, as provided herein, a service level of the service may be monitored in real-time during operation of the service so that the assignment of components of the service to infrastructure tiers can be dynamically modified based upon current/trending/projected costs of levels of resources of the infrastructure tiers, a current service level of the service, and/or a migration cost to migrate components between different infrastructure tiers or between different providers of a same type of infrastructure tier. In this way, a current service level of the service can be satisfied at a reduced (e.g., minimized) cost.

Figure 4:
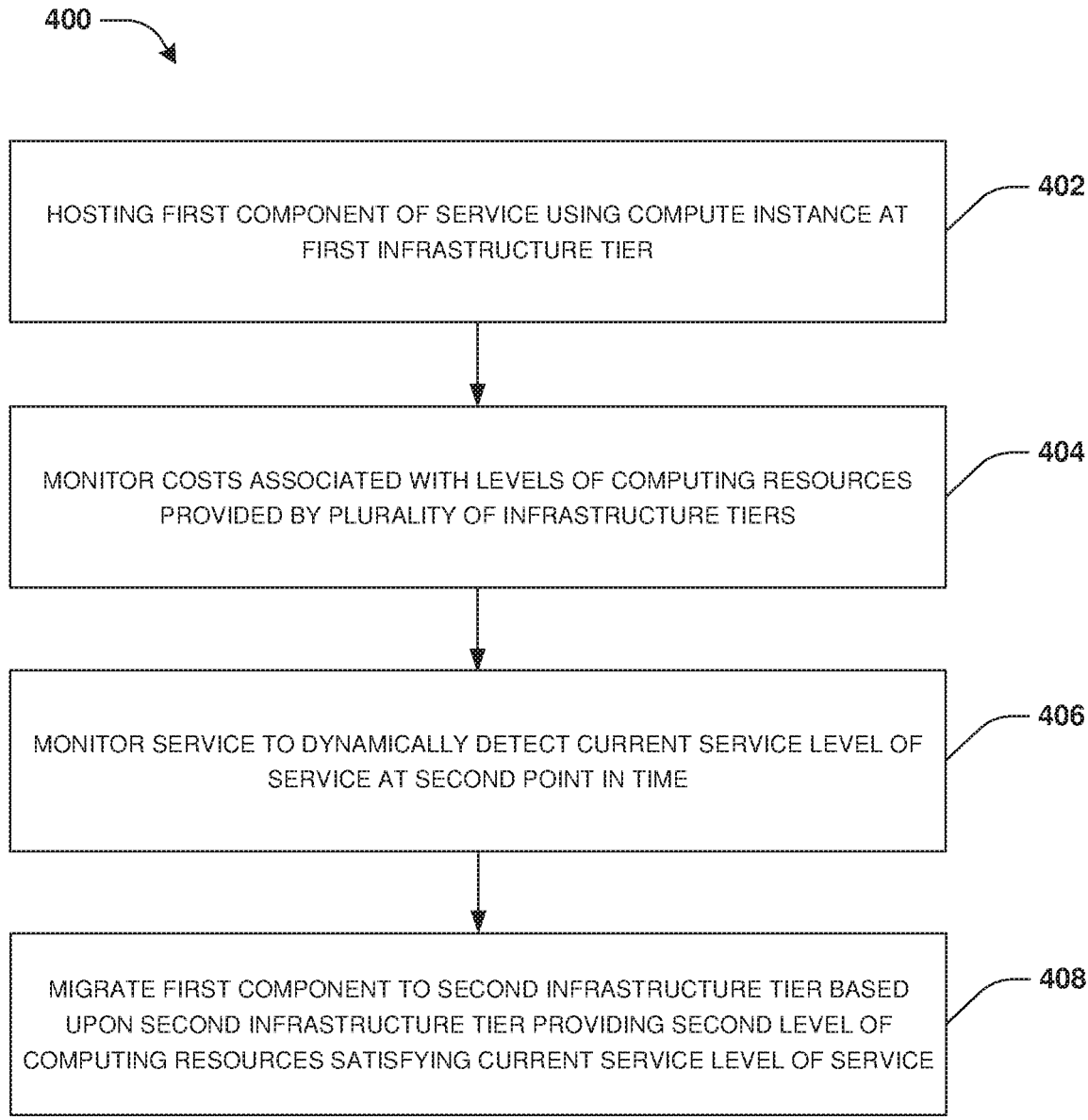
FIG. 4 is a flow chart illustrating an example method for cost optimized services for dynamic service levels.
Figure 5A:
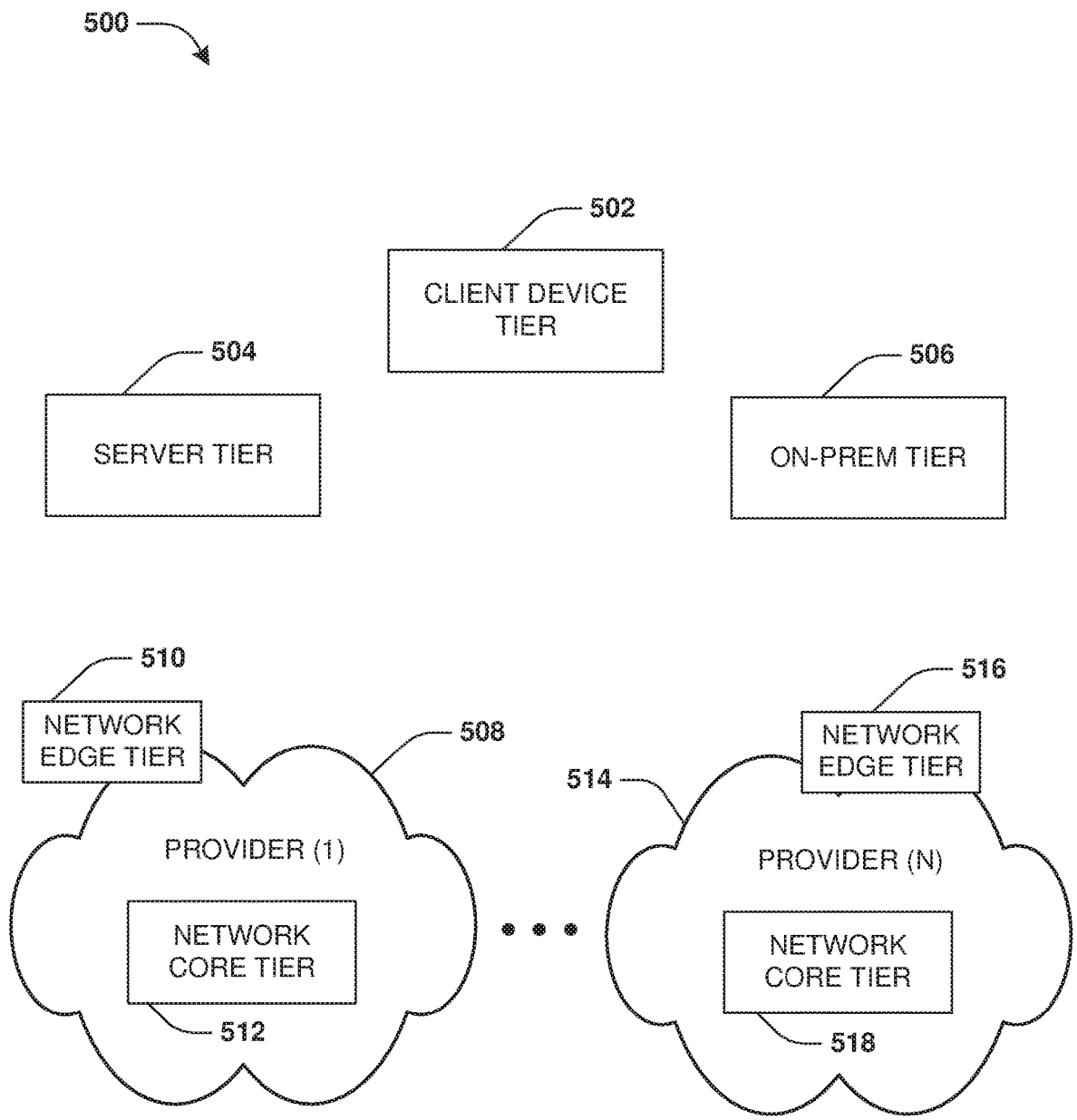
FIG. 5A is a component block diagram illustrating an example system for cost optimized services for dynamic service levels, where components of a service can be hosted across a plurality of infrastructure tiers.
Figure 5B:
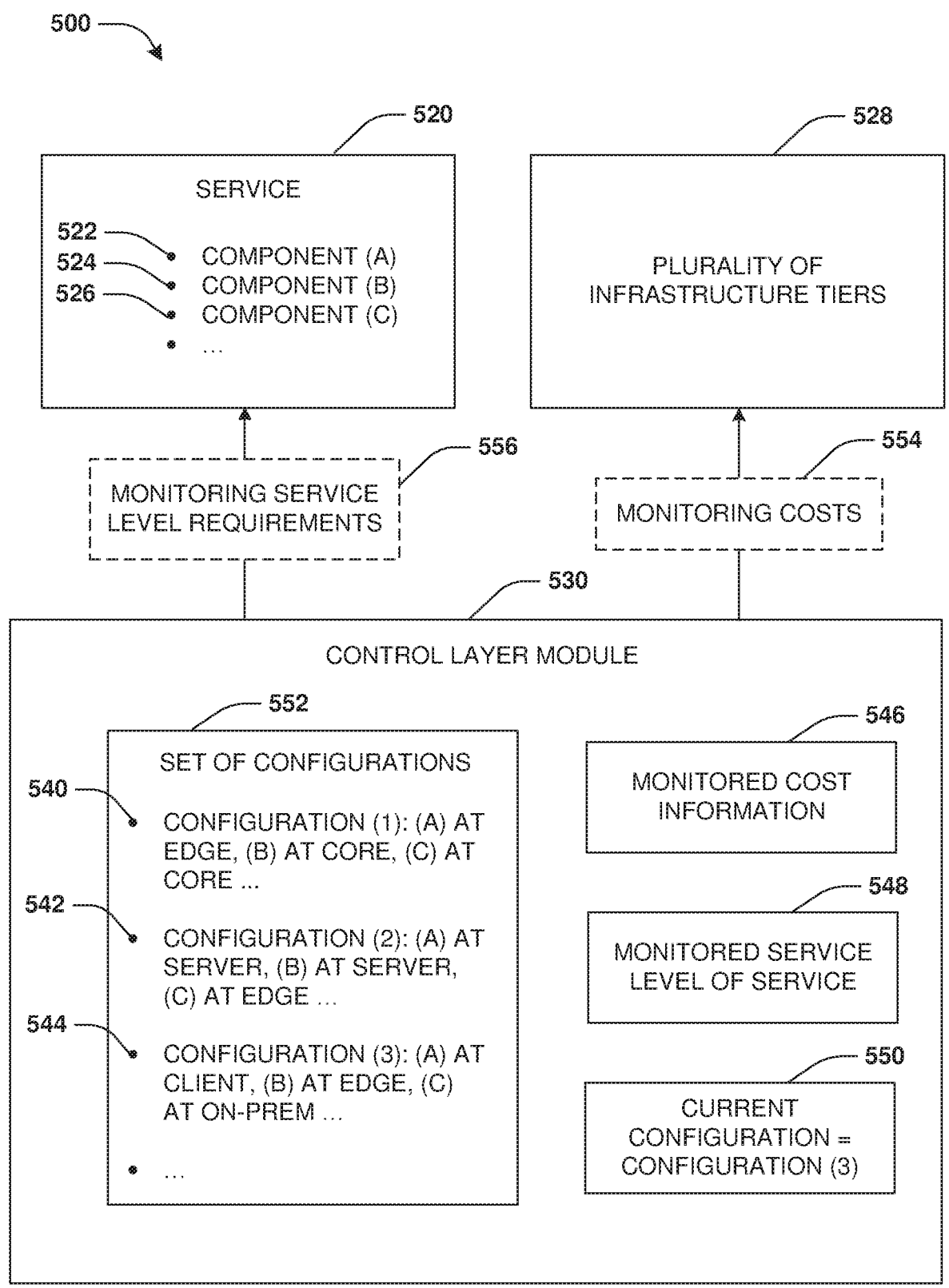
FIG. 5B is a component block diagram illustrating an example system for cost optimized services for dynamic service levels, where components of a service are hosted at infrastructure tiers according to a third configuration.

An embodiment of cost optimized services for dynamic service levels is illustrated by an example method 400 of FIG. 4, which is described in conjunction with system 500 of FIGS. 5A-5D. FIG. 5A illustrates a multi-tier infrastructure comprising various infrastructure tiers and various providers of infrastructure tiers. In an example, a client device tier 502 may correspond to client devices, such as computers, mobile devices, wearable devices, etc. Components (e.g., a client application, a caching component used to cache data of a service, etc.) of a service may be capable of being hosted by client devices of the client device tier 502. A server tier 504 may comprise various servers (e.g., servers of a data center) configured to host components of services through compute instances (e.g., virtual machines). An on-premises tier 506 may comprise computing devices, storage, and a network maintained by a provider of the service. A first provider 508 (e.g., a first cloud service provider) may provide a first cloud tier, a first network edge tier 510, a first network core tier 512, etc. A second provider 514 (e.g. a second cloud service provider) may provide a second cloud tier, a second network edge tier 516, a second network core tier 518, etc. In this way, various infrastructure tiers may be available for hosting components of a service, such as a service 520 illustrated in FIG. 5B.

The service 520 may comprise a component (A) 522, a component (B) 524, a component (C) 526, and/or other components. It may be appreciated that the service 520 may comprise a single component or any number of components. A control layer module 530 may be configured to assign and/or dynamically reassign components of the service 520 to infrastructure tiers of a plurality of infrastructure tiers 528. The control layer module 530 may perform the assignment based upon various available configurations or may perform the assignment based upon a configuration determined on-the-fly (e.g., dynamically determining an assignment as opposed to selecting a pre-defined configuration). For example, the control layer module 530 evaluates the service 520 to identify the components of the service 520 to determine whether the components of the service 520 can be hosted at various infrastructure tiers. The control layer module 520 evaluates the plurality of infrastructure tiers 528 to identify levels of computing resources and costs of each infrastructure tier. The control layer module 530 may generate a set of configurations 552 corresponding to determined assignments of components to infrastructure tiers that provide particular levels of computing resources at certain costs.

In an example, a first configuration 540 comprises an assignment of the component (A) 522 to a network edge tier, the component (B) 524 to a network core tier, and the component (C) 526 to the network core tier. In an embodiment, the nesting of components and/or compute instances may be supported. The first configuration 540 may correspond to a relatively higher level of computing resources (e.g., CPU cycles, storage space, bandwidth, etc.) and cost. A second configuration 542 comprises an assignment of the component (A) 522 to a server tier, the component (B) 524 to the server tier, and the component (C) 526 to the network edge tier. The second configuration 542 may correspond to a relatively moderate level of computing resources and cost. A third configuration 544 comprises an assignment of the component (A) 522 to a client tier, the component (B) 524 to the network edge tier, and the component (C) 526 to an on-premises tier. The third configuration 544 may correspond to a relatively lower level of computing resources and cost.

At 402, components of the service 520 may be assigned to a first set of infrastructure tiers for hosting through compute instances (e.g., virtual machine) based upon the first set of infrastructure tiers providing a level of computing resources satisfying a service level of the service 520 at a first point in time. For example, the third configuration 544 may be set as a current configuration 550 for assigning the components of the service 520 to particular infrastructure tiers. The third configuration 544 may be selected as satisfying the service level of the service 520 as a relatively lower cost than other configurations of infrastructure tiers also capable of satisfying the service level of the service 520 at the first point in time. For example, the component (A) 522 may be assigned to a client device for hosting at the client tier, the component (B) 524 may be assigned to an edge computing device for hosting at the network edge tier, and the component (C) 526 may be assigned to an on-premises computing device for hosting at the on-premises tier. It may be appreciated that components of a service may be assigned to the same infrastructure tier, different infrastructure tiers, different providers of the same type of infrastructure tier, or any other combination thereof.

At 404, costs associated with levels of computing resources (e.g., CPU cycles, storage space, network bandwidth, latency guarantees, etc.) provided by the plurality of infrastructure tiers 528 may be monitored 554 to collect monitored cost information 546. Each provider of an infrastructure tier may have various monetary costs associated with various levels of computing resources that can be purchased/subscribed, which can be tracked as the monitored cost information 546 since such costs may vary over time. The monitored cost information 546 may be evaluated to identify cost trends, project future costs, etc.

At 406, the service 520 may be monitored 556 to dynamically track monitored service levels 548 of the service 520 over time, such as a current service level of the service 520 at a second point in time. In an example, a provider of the service 520 may specify a current service level agreement (SLA) for the service 520 (e.g., requested CPU cycles, storage space, bandwidth, I/O per second (IOPS), transactions per minute, etc.). In another example, the control layer module 530 may monitor operation of the service 520 to identify increases/decreases in requests to be processed by the service 520 (e.g., an increase in demand from retail stores for a purchase processing service during a busy shopping holiday).

Figure 5C:
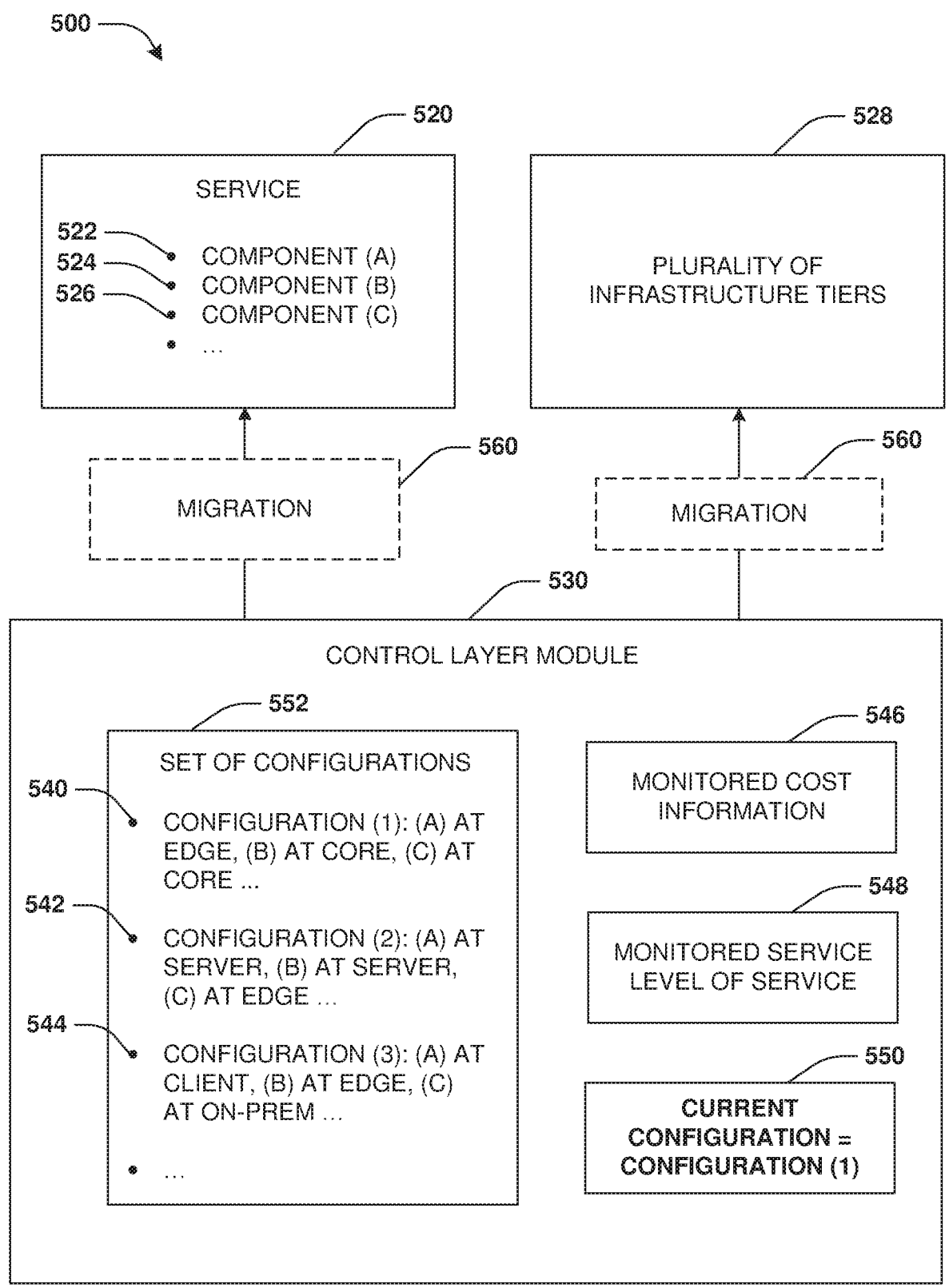
FIG. 5C is a component block diagram illustrating an example system for cost optimized services for dynamic service levels, where components of a service are migrated based upon a first configuration.

At 408, one or more components of the service 520 may be migrated 560 amongst infrastructure tiers 528 based upon the current service level of the service 520 at the second point in time, as illustrated by FIG. 5C. For example, the monitored cost information 546 and the monitored service level 548 of the service 520 may indicate that the first configuration 540 will satisfy the current service level at a lower cost than the other configurations. Accordingly, the control layer module 530 may migrate the component (A) 522 from the client device to a network edge device for hosting within the network edge tier, the component (B) 524 from the network edge device to a network core device for hosting within the network core tier, and the component (C) 526 from the on-premises device to a network core device for hosting within the network core tier based upon the first configuration 540 being set as a current configuration 550 for the service 520. Depending on the configuration used, any number of components (e.g., all components or less than all components) may be migrated since the new configuration (e.g., the first configuration 540) may specify that certain components are to remain at the same infrastructure tier.

Various consideration may be taken into account when determining whether to perform the migration 560 or retain the assignment of the components at the first set of infrastructure tiers 528. In an example, a migration cost to migrate 560 one or more components (e.g., a cost to cancel a current subscription with a current infrastructure tier, a cost and resource usage to move a component to a new infrastructure tier, any initial startup costs with starting up with the new infrastructure tier, etc.) of the service 520 may be considered. For example, the migration cost may be compared with a cost savings of migrating to the second set of infrastructure tiers. If the migration cost does not outweigh the cost savings such as by a threshold amount, then the migration 560 may be performed. Otherwise, if the current service level can still be satisfied by the first set of infrastructure tiers and the migration cost outweighs the cost savings, then the migration 560 may not be performed. If the first set of infrastructure tiers cannot satisfy the current service level of the service 520, then the migration cost may not be considered because a migration would have to be performed to satisfy the current service level. In an example, various configurations could satisfy the current service level of the service 520, and thus a lowest cost configuration may be utilized.

In another example, a rule set and dependency map may be utilized to determine whether the migration is allowed/feasible. That is, a feasibility and cost to migrate one or more components of the service 520 may be taken into consideration. For example, a rule may specify that no more than a threshold number of allowed migrations can occur within a time period. If the threshold has been reached, then the migration 560 is not performed until the time period has expired. In another example, a rule may specify that a component is to be hosted at a current infrastructure tier for at least a threshold time duration before being eligible to be migrated. In another example, an application is comprised of three components (e.g., three web services). An administrator can setup a set of rules (e.g., rules stored in a database, table, XML document, etc.) that stipulate how many times a component of the application can be moved from one infrastructure tier to the next infrastructure tier, a minimum amount of time that the component is to remain in a infrastructure tier before being eligible to be moved, and/or a minimum savings threshold achievable before the component can be moved to the next infrastructure tier. The set of rules may be defined and/or implemented at an application level and/or a component level. The administrator can stipulate certain times when the application will not move despite cost savings because a business service level agreement (SLA) is too stringent to make a change in configuration. In this way, an administrator can configure a migration process for each component and/or application, which is stored (e.g., within configuration files, which are verified as acceptable) and used by a control plane to do the migration. These procedures can also be used to move an application and/or component to an alternate configuration if a current H/W/instance that they are hosted on has a failure, thus creating an automatic restore. In an embodiment, a configuration (e.g., a mapping of components to infrastructure tiers) specified within a configuration file must first be deemed acceptable (e.g., an allowable configuration is restricted to where two of the three components must be hosted at the same infrastructure tier) before being implemented, such as where a component could be run at a lower cost in a different tier but is not allowed to be migrated by the configuration (e.g., the migration would cause all three components to be hosted in different infrastructure tiers).

In an embodiment, the savings takes into account the cost of migrating a component. The control plane that migrates applications may reduce (e.g., minimize) this cost by blending current transactions on an old instance of a component/application and creating new ones on a new instance of the component/application. Existing ones will be transitioned over at an appropriate place in the transaction. This may be made feasible by implementing a micro services architecture.

In an embodiment, a minimum amount of time and/or a maximum amount of time a component is to stay at a particular infrastructure tier is taken into account. The minimum and maximum amounts of time are taken into account to prevent thrashing of a component/application.

In this way, various considerations are taken into account in determining whether to migrate from the first set of infrastructure tiers to another set of infrastructure tiers.

Figure 5D:
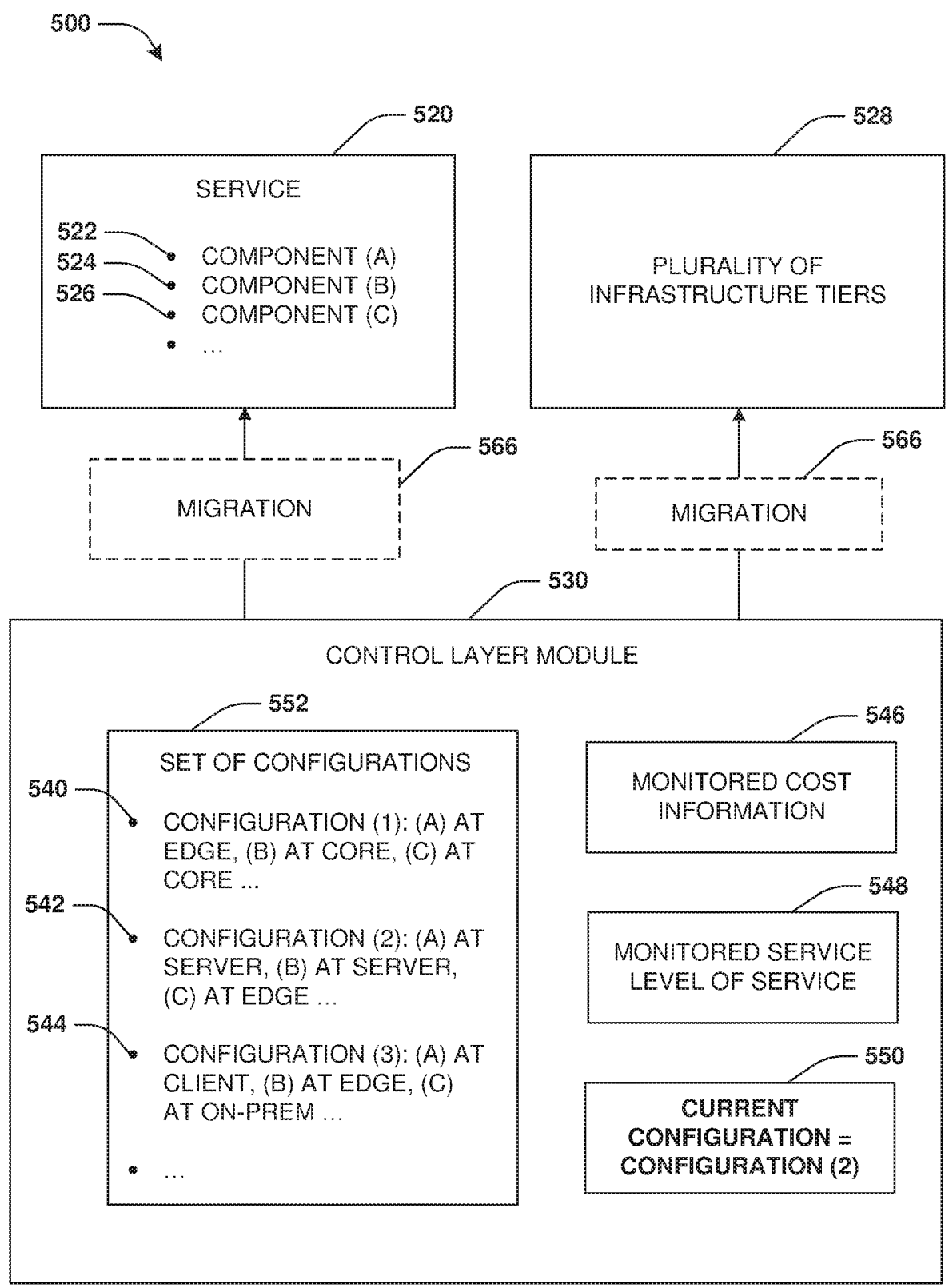
FIG. 5D is a component block diagram illustrating an example system for cost optimized services for dynamic service levels, where components of a service are migrated based upon a second configuration.

FIG. 5D illustrates the control layer module 530 continuing to monitor costs associated with level of computing resources provided by the plurality of infrastructure tiers 528 and service levels of the service 520 over time. The control layer module 530 may determine that the second configuration 542 may satisfy a current service level of the service 520 at a third point in time at a lower cost than the first configuration 540 (e.g., a decrease in demand from retail stores for the purchase processing service during a lull after the holiday season). Accordingly, the second configuration 542 is used as the current configuration 550 so that the current service level of the service 520 at the third point in time can be satisfied at a lower cost. The control layer module 530 may migrate 566 the component (A) 522 from the network edge device to a server for hosting at the server tier, the component (B) 524 from the network core device to a server for hosting at the server tier, and component (C) 526 from the network core device to a network edge device for hosting within the network edge tier. In this way, the service 520 may be dynamically migrated between infrastructure tiers based upon current service level requirements of the service 520 at various points in time in a manner that may reduce costs.

In an example, cost trends of the plurality of infrastructure tiers may be monitored. The cost trends may correspond to a cost by a certain provider (e.g., a provider of an infrastructure tier) for a certain level of computing resources, which may fluctuate over time. The cost trends may be evaluated to identify a particular provider and/or infrastructure tier this is currently or is predicted/projected to provide a level of computing resources required by the service 520 at a cost that is less than a current cost of a current infrastructure tier currently hosting components of the service 520. Accordingly, a recommendation may be provided to a provider of the service 520 to migrate one or more components of the service 520 from the current infrastructure tier to a different infrastructure tier. In an example, the one or more components of the service 520 may be automatically migrated by the control layer module 530. In an example, machine learning may be used to learn patterns of resource demand by the service 520 and/or to predict a set of projected costs of infrastructure tiers based upon historic costs, which may be used to proactively/automatically migrate one or more components of the service 520 to particular infrastructure tiers that will be capable of meeting the resource demand and a lowest cost.

In an embodiment, costs per component of an application are monitored. A cost of the application in an allowable configuration (e.g., an allowable configuration constraint may specify that the components of the application must be hosted, such as assigned to infrastructure tiers, only by allowable configurations such as where at least three of five total components of an application are hosted at the same infrastructure tier) may be calculated. A minimum cost of the application without the allowable configuration constraint (e.g., the ability to host components by a non-allowable configuration, such as where less than three of the five total components are hosted at the same infrastructure tier). A recommendation to modify the allowable configurations to achieve the minimum cost may be provided (e.g., a recommendation to allow an assignment of the components to infrastructure tiers that achieve the minimum cost).

In an example, an application may have three components that run on three infrastructure tiers. The allowable configurations require that two of the components run on the same infrastructure tier. However, a configuration with a much lower cost may be achievable if each component can be run independently without having two of the components running at the same infrastructure tier. A recommendation of such may be provided so that an application owner can make a few edits for how the application is run in order to support this recommended configuration in order to reduce operational costs.

Figure 6:
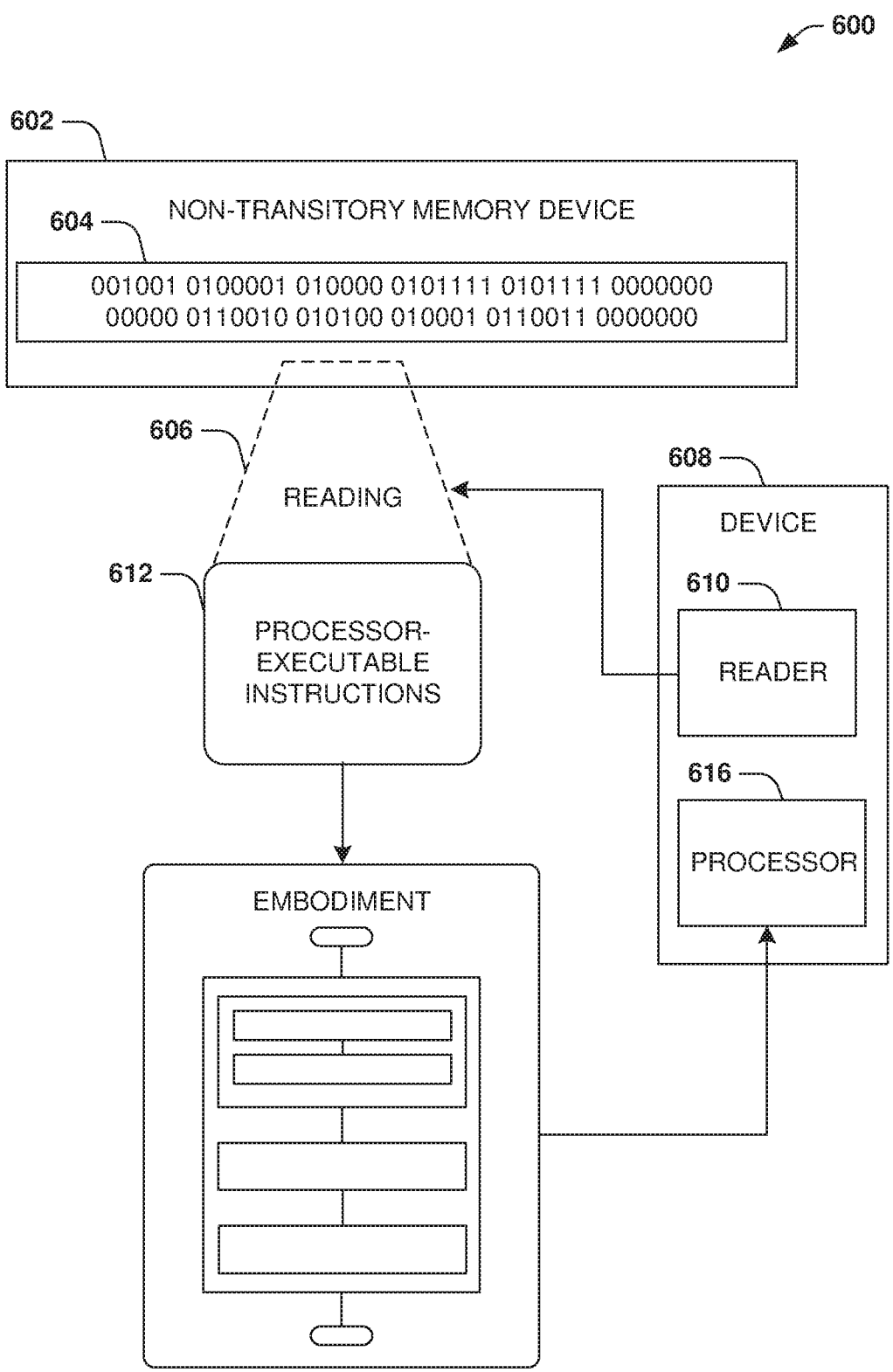
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIGS. 5A-5D, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   executing, on a processor of a computing device, instructions that cause the computing device to perform operations, the operations comprising:
      hosting a first component of a service using a first compute instance at a first infrastructure tier based upon the first infrastructure tier providing a level of computing resources satisfying a service level of the service at a first point in time;
      monitoring costs associated with levels of computing resources provided by a plurality of infrastructure tiers;
      monitoring the service to dynamically detect a current service level of the service at a second point in time; and
      in response to determining that a migration cost to migrate the first component to a second infrastructure tier for hosting as a migrated compute instance does not out weight a cost savings corresponding to a cost difference between hosting the first component at the first infrastructure tier and hosting the first component at the second infrastructure tier, migrating the first component to the second infrastructure tier based upon the second infrastructure tier providing a second level of computing resources satisfying the current service level of the service.

2. The method of claim 1, comprising:
   determining whether to migrate the first component based upon whether a threshold number of allowed migrations within a time period has been reached.

3. The method of claim 1, comprising:
   determining whether to migrate the first component based upon whether the first component has been hosted at the first infrastructure tier for at least a threshold duration.

4. The method of claim 1, wherein the service comprises a second component hosted at a third infrastructure tier as a second compute instance based upon the third infrastructure tier providing a second level of computing resources satisfying the service level of the service at the first point in time.

5. The method of claim 4, wherein the migrating comprises:
   migrating the first component to the second infrastructure tier while maintaining the second component at the third infrastructure tier.

6. The method of claim 4, wherein the migrating comprises:
   migrating the first component to the second infrastructure tier and the second component to a different infrastructure tier than the third infrastructure tier.

7. The method of claim 1, wherein the service comprises a plurality of components capable of being hosted by the plurality of infrastructure tiers, and wherein the method comprises:
   defining a set of configurations available for hosting the plurality of components of the service, wherein a first configuration specifies an assignment of the plurality of components to infrastructure tiers within the plurality of infrastructure tiers, a cost of the assignment, and a level of computing resources provided by the assignment.

8. The method of claim 7, wherein a second configuration specifies a second assignment, different than the assignment, of the plurality of components to infrastructure tiers within the plurality of infrastructure tiers, a second cost of the second assignment, and a second level of computing resources provided by the second assignment.

9. The method of claim 7, wherein the migrating comprises:
   selecting a target configuration from the set of configurations based upon the target configuration providing a target level of computing resources satisfying the current service level of the service at the second point in time.

10. The method of claim 9, wherein the migrating comprises:
    migrating one or more components of the service to different infrastructure tiers based upon the target configuration.

11. The method of claim 9, wherein the selecting comprises:
    selecting the target configuration based upon the target configuration having a cost that is less than costs of other configurations having assignments satisfying the current service level of the service at the second point in time.

12. A computing device comprising:

a processor; and memory comprising processor-executable instructions that when executed by the processor cause performance of operations, the operations comprising:

hosting components of a service across a first set of infrastructure tiers of a plurality of infrastructure tiers based upon the first set of infrastructure tiers providing a level of computing resources satisfying a service level of the service at a first point in time;

monitoring costs associated with levels of computing resources provided by the plurality of infrastructure tiers;

monitoring the service to dynamically detect a current service level of the service at a second point in time;

identifying a second set of infrastructure tiers that provide a second level of computing resources satisfying the current service level; and performing a migration of the service to host the components of the service across the second set of infrastructure tiers.

13. The computing device of claim 12, wherein the operations comprise:

determining whether to perform the migration based upon a feasibility and cost to migrate one or more components of the service.

14. The computing device of claim 12, wherein the operations comprise:

monitoring costs per component of an application;

calculating a cost of the application in an allowable configuration and a minimum cost of the application without an allowable configuration constraint specifying that components of the application are restricted to be assigned to infrastructure tier according to allowable configurations; and providing a recommendation to modify the allowable configurations to achieve the minimum cost.

15. The computing device of claim 14, wherein the recommendation is to allow an assignment of the components to infrastructure tiers to achieve the minimum cost.

16. The computing device of claim 15, wherein machine learning functionality is utilized to predict a set of projected costs based upon historic costs.

17. The computing device of claim 12, wherein the plurality of infrastructure tiers comprises a client device tier, a network edge tier, a network core tier, a cloud tier, an on-premises tier, and a server tier.

18. A non-transitory machine readable medium having stored thereon processor-executable instructions that when executed cause performance of operations, the operations comprising:

hosting a first component of a service at a first infrastructure tier based upon the first infrastructure tier providing a level of computing resources satisfying a service level of the service at a first point in time;

monitoring costs associated with levels of computing resources provided by a plurality of infrastructure tiers; and in response to determining that a migration cost to migrate the first component to a second infrastructure tier does not out weight a cost savings corresponding to a cost difference between hosting the first component at the first infrastructure tier and hosting the first component at the second infrastructure tier, migrating the first component to the second infrastructure tier based upon the second infrastructure tier providing a second level of computing resources satisfying a current service level of the service.

19. The non-transitory machine readable medium of claim 18, wherein the operations comprise:

utilizing a rule set and dependency map to determine whether the migration is allowed.

20. The non-transitory machine readable medium of claim 18, wherein the operations comprise:

learning patterns of resource demand by the service; and proactively migrating components of the service based upon the patterns of resource demand.

* * * * *